United States Patent [19]
Wachsmuth et al.

[11] 3,794,377
[45] Feb. 26, 1974

[54] COMPRESSOR ENCLOSURE

[76] Inventors: Erich A. Wachsmuth, 1810 Ridgemoor Dr., Long Beach; Charles F. Goede, R.R. No. 4, Michigan City, both of Ind. 46360

[22] Filed: June 5, 1972

[21] Appl. No.: 259,955

[52] U.S. Cl............ 296/146, 49/169, 98/32, 181/33 K
[51] Int. Cl............................................. B60j 5/04
[58] Field of Search.. 296/146, 155, 147; 180/54 A; 181/33 K, 33 GB; 98/61, 62, 64, 65, 99.2, 99.3, 99.4; 49/109, 169, 163, 171, 71

[56] References Cited
UNITED STATES PATENTS

| | | | |
|---|---|---|---|
| 1,004,563 | 10/1911 | Fry | 49/163 X |
| 1,693,442 | 11/1928 | Henritzy | 98/99.3 |
| 1,991,611 | 2/1935 | Gano | 296/146 |
| 2,219,340 | 10/1940 | Smith et al | 296/146 |
| 3,119,441 | 1/1964 | Furry | 49/163 X |

*Primary Examiner*—David Schonberg
*Assistant Examiner*—John A. Pekar

[57] ABSTRACT

Compressor enclosure door arrangement whereby the doors are maintained closed to attenuate operating noise while the entire door configuration is hingedly opened with the uppermost portion forming a ventilation space with a minimum of noise transmission and also including selectively opened end panels for providing additional ventilation or additional noise dampening as desired.

8 Claims, 3 Drawing Figures

COMPRESSOR ENCLOSURE

BACKGROUND OF THE INVENTION

In operation of compressors and more particularly portable compressors, proper ventilation is provided for by having intake fans draw large amounts of ventilating air through heat exchangers into the compressor enclosure for cooling the compressor and associated apparatus and then discharged through open service doors in the sides and floor of the enclosure chassis. Although the open doors properly ventilate the compressor the open doors permit excessive noise diffusion to usually exceeding permissible noise levels in the operating area.

Noise control may be accomplished by closing the doors, mounting the power unit on vibration dampeners and covering the usual heavy sheet metal enclosure inside with a vibration dampening coating of sound absorbing material. Sound absorbing ducts are provided to vent the cooling air in the least obtrusive direction after passing through the enclosure. This means of noise attenuation is very costly, bulky in size and makes servicing of the compressor difficult.

Another noise abatement arrangement would be to close the service doors and provide additional air discharge vents or openings in the roof of the enclosure. This arrangement can become complicated by interference with other necessary service openings and operating linkage and actuators therefor and additionally would require special shielding to prevent the enclosed motors, wiring and associated equipment from being directly exposed to foul weather conditions. Other arrangements to effect noise attenuation have proved costly, awkward in construction and a definite interference to service operations.

SUMMARY

According to the present invention there is provided a new and novel noise directing apparatus using a unique door frame and hinging means whereby the door assembly is opened at the top to vertically vent the cooling air from the enclosure. A plurality of sectorally shaped baffle panels are secured to the vertical ends of the door frame assembly to be selectively opened for additional ventilation if desired or closed to further reduce the noise level when necessary.

Other provisions of this invention will be more apparent when taken in conjunction with the following detailed description and the accompanying drawings wherein.

DESCRIPTION

Figure 1:
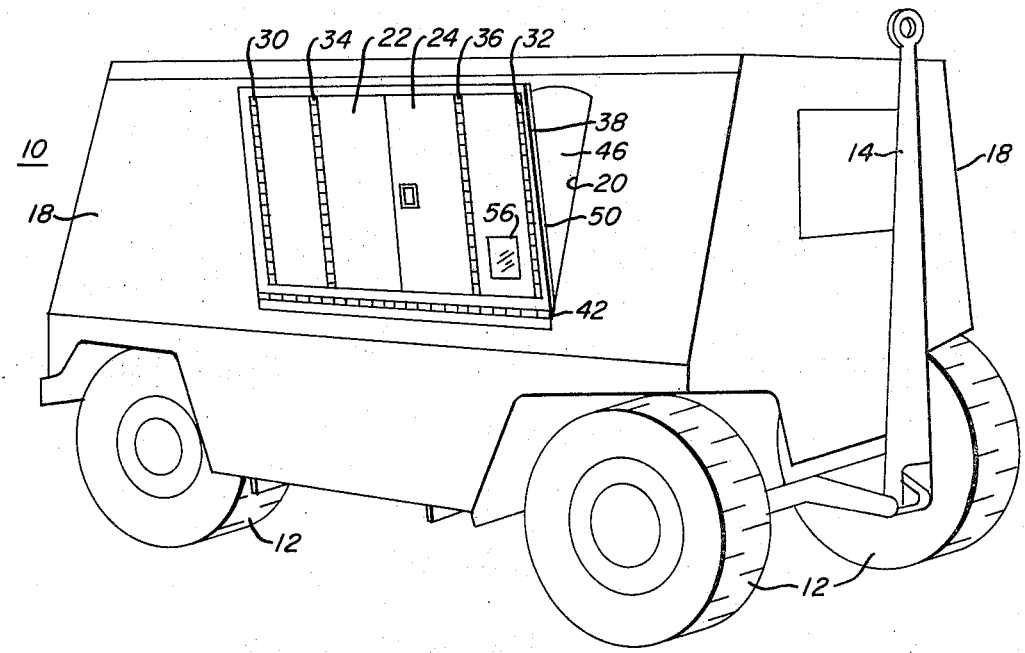
FIG. 1 is a perspective view of a portable compressor enclosure mounted on wheels showing the novel door arrangement of this invention in an open position.
Figure 2:
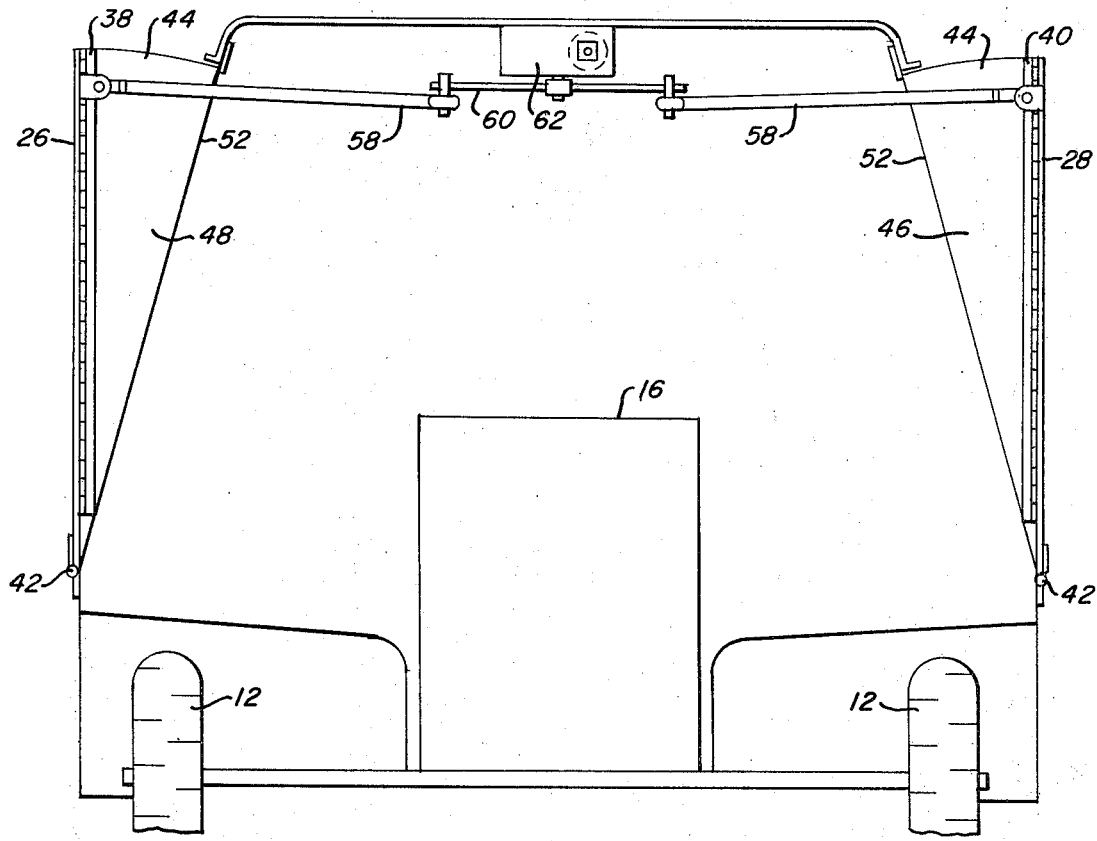
FIG. 2 is an end view of a section of the FIG. 1 compressor enclosure illustrating the door opening and closing mechanism with the doors in the open position.

Referring to FIG. 1, there is shown a portable compressor enclosure 10 mounted on wheels 12 to be towed by tow bar 14 to any desired site for operation of a compressor 16, (FIG. 2) housed within the enclosure 10. The body of the enclosure 10 is truncated with the side panels 18 inclined inwardly at about 15° towards the top. Door openings 20 are formed on each side panel 18 of the enclosure 10 for access to the compressor. The doors 22 and 24 of door sets 26 and 28 on opposite sides of the body are each hinged at their outer side edges by hinges 30 and 32 respectively and hinged in the middle by hinges 34 and 36 such that selectively one half of each door may be opened in a folding manner or the whole door may be opened as desired. Both of the folding door sets 26 and 28 are mounted in their respective door openings 20 in novel frames 38 and 40 which fit the entire openings 20 and are horizontally hinged along their lower edge by hinges 42 which permit both closed doors 22 and 24 of the door sets 26 and 28 to be pivoted outward with the frames 38 and 40 from the inclined side panels 18 to a vertical position thereby forming an elongated rectangular opening 44 between the top of frames 38, 40 and the side panels 18 for ventilating the compressor enclosure 10 upwardly therethrough. Sector shaped openings 46 and 48 will be formed at each end of the open frames 38 and 40 with the side panels 18, however, sectorally shaped side aprons 50 and 52 are secured to the frames 38 and 40 by hinges 54 such that the side aprons 50 and 52 may be swung closed perpendicular to the frames 38 and 40, if desired, to thereby further prevent noise distribution therethrough by permitting the opening from the enclosure 10 to atmosphere to be only vertically directed through the top opening 44 as described hereinbefore.

A window 56 may be provided in door 24 to view necessary instruments and gages (not shown) within the enclosure 10 while the doors 22 and 24 are closed.

A door actuator system for opening and closing the frames 38 and 40 includes a plurality of actuator rods 58 suitably secured on their outer ends to the top of the frames 38 and 40 and extending inwardly to a plurality of rotatable double-ended levers 60. The double-ended levers 60 are rotatably positioned by operation of well known rack and pinion gear boxes 62 secured on or near the roof of the enclosure 10 at the centerline thereof. The rack and pinion gear boxes 62 are operably positioned by a common drive rod 64 which in turn is selectively positioned lengthwise along the centerline of the roof the enclosure 10 responsive to operation of a pressure operated power cylinder 66. The power cylinder 66 is selectively supplied with a fluid under pressure from the compressor 16 or vented to atmosphere, under the control of valving means 68. The valving means 68 is shown in FIG. 3 as connected by pipe means 70 and mounted outside the end of the enclosure 10 but can be conveniently mounted where desired to control the venting of the power cylinder or the supply of fluid under pressure from a supply reservoir (not shown) to the power cylinder 66.

Figure 3:
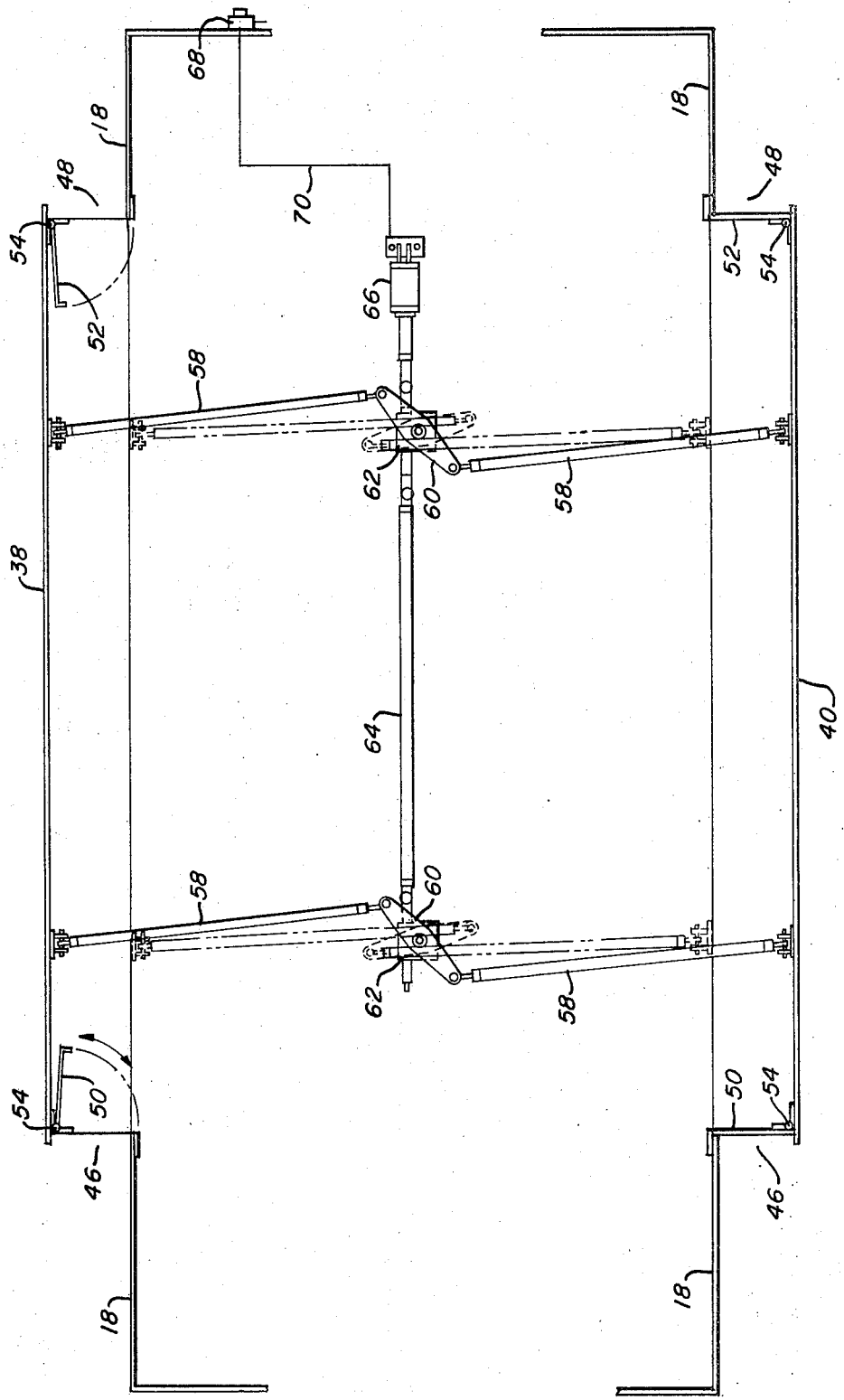
FIG. 3 is a top sectional view of the door opening and closing apparatus as attached to the open doors of the FIG. 1 compressor enclosure.

In operation, the running compressor 16 in the enclosure 10 must be ventilated without the necessity of opening the doors 22 and 24 which would permit a high level of noise therefrom. To achieve proper ventilation and maintain a low noise level, the operator positions the valving means 68 to supply fluid under pressure via pipe means 70 to one side of a piston (not shown) in the power cylinder 66, the opposite side of said piston being vented, thereby actuating the piston to move the drive rod 64 to the left (as seen in FIG. 3). Movement of the drive rod 64 to the left causes the rack and pinion gear boxes 62 to rotate the double-ended levers 60 in a counter clockwise direction (as viewed in FIG. 3)

to an "open" position shown in solid line in FIG. 3. In the "open" position the actuator rods 58 are moved outwardly relative to the center of the enclosure 10 to thereby move the frames 38 and 40 and the closed doors 22 and 24 contained therein to the outward open position shown in FIGS. 1, 2 and 3. In the open position the side aprons 50 and 52 may be pivoted on their hinges 54 to a closed position (illustrated in FIG. 3) to close off the sector shaped openings 46 and 48 such that the only ventilating passages remaining is the vertical passages from the enclosure 10 up through the elongated rectangular opening 44 (FIG. 2) formed between the top of the frames 38, 40 and the top of the side panels 18. In the described open position the opening 44 is of sufficient dimensions to provide proper ventilation between the enclosure 10 and atmosphere while directing noise therefrom straight up to effectively shield the compressor noises. It should also be noted that the opening 44 are off to the side of the compressor 16 and its necessary controls to prevent damage thereto during inclement weather.

To close the novel door arrangement, the valving means 68 is operated to vent the said one side of the piston (not shown) in the power cylinder while supplying fluid under pressure to the said opposite side to actuate the piston to move the driving rod 64 to the right (as seen in FIG. 3). Movement of the drive rod 64 to the right causes the rack and pinion gear boxes 62 to rotate the double ended levers 60 in a clockwise direction (as viewed in FIG. 3) through an arc of approximately 100° to a closed position shown in dotted line in FIG. 3. In the closed position, the actuator rods 58 are moved inwardly relative to the center of the enclosure 10 to thereby move the frames 38 and 40 and the closed doors 22 and 24 contained therein against the side panels 18 in a closed position, a normal position desired when the compressor operation is stopped.

It should be noted that although open and closed positions are described, intermediate degrees of ventilation and noise level may be obtained by variation in the degree of opening of the frames 38 and 40 under the control of the valving means 68. Other variations of the degree of ventilation and noise level may be obtained by varying the degree of closing the side aprons 50 and 52.

Although I have shown and described only one embodiment of the present invention, different embodiments may be comprised of variations in the angle and the size of the openings 44 and means for opening and closing the novel door arrangement without departing from the spirit and scope thereof, it is intended that all matter contained in the foregoing description as shown in the accompanying drawings shall be interpreted as illustrative and not in a limiting sense.

We claim:

1. A compressor enclosure adapted to contain a compressor therein comprising: a compressor enclosure body having an opening therein locatable adjacent the exhaust of such a compressor; sound baffeling means carried by said body and being selectively movable into closed and open positions with the outer periphery of said opening; said sound baffling means including an upwardly extending frame portion and first hinge means connecting the bottom of said frame portion to said enclosure body for selectively rotating said baffling means outwardly with respect to said enclosure body about an axis of said first hinge means which extends along said bottom of said frame portion; and said sound baffling means additionally including door means extending intermediate peripheral portions of said frame portion and second hinge means connecting said door means to said frame portion for selectively opening said door means.

3. The compressor enclosure as set forth in claim 1 wherein side panels extend vertically between the vertical sides of said frame portion and said enclosure body when said frame portion is rotated outwardly.

4. The compressor enclosure as set forth in claim 1 wherein said selective rotation of said baffling means is variable according to the degree of movement of said frame portion about said first hinge means.

5. The compressor enclosure as specified in claim 1 wherein a linkage means is provided for variably positioning said frame about said horizontal hinge means.

6. The compressor enclosure as specified in claim 5 wherein said linkage means includes control means remote from said frame.

7. The compressor enclosure as specified in claim 6 wherein said control means is pressure fluid operated.

8. The compressor enclosure as specified in claim 5 wherein said linkage means is located in the upper confines of said enclosure remote from equipment enclosed therein.

* * * * *

UNITED STATES PATENT OFFICE
CERTIFICATE OF CORRECTION

Patent No. 3,794,377　　　　　　　　　Dated February 26, 1974

Inventor(s) Erich Wachsmuth et al

It is certified that error appears in the above-identified patent and that said Letters Patent are hereby corrected as shown below:

Add Claim 2 and amend claims 5 and 6.

Claim 2.　　The compressor enclosure as specified in claim 1 wherein said first and second hinge means are independent of each other.

Claim 5, line 3, after "frame" insert -- portion --;
　　　　　line 3, delete "horizontal" and substitute -- first -

Claim 6, line 3, after "frame" insert -- portion --.

Signed and sealed this 9th day of July 1974.

(SEAL)
Attest:

McCOY M. GIBSON, JR.　　　　　　　　　C. MARSHALL DANN
Attesting Officer　　　　　　　　　　 Commissioner of Patent

FORM PO-1050 (10-69)　　　　　　　　　　　　　　　　　　USCOMM-DC 60376-P69